(12) United States Patent
Dowty et al.

(10) Patent No.: US 8,775,276 B2
(45) Date of Patent: Jul. 8, 2014

(54) SYSTEM, METHOD, AND APPARATUS FOR SUPPLY CHAIN MANAGEMENT

(75) Inventors: Tracy L. Dowty, Amarillo, TX (US); Phillip B. Cobb, Canyon, TX (US); Dan W. Mercer, Canyon, TX (US); Casey W. Bradshaw, Canyon, TX (US); Heather U. Peoples, Amarillo, TX (US); Lisa J. Foreman, Canyon, TX (US)

(73) Assignee: Consolidated Beef Producers, Inc., Canyon, TX (US)

( * ) Notice: Subject to any disclaimer, the term of this patent is extended or adjusted under 35 U.S.C. 154(b) by 1341 days.

(21) Appl. No.: 11/185,576

(22) Filed: Jul. 20, 2005

(65) Prior Publication Data

US 2007/0022024 A1    Jan. 25, 2007

(51) Int. Cl.
  *G06Q 10/00* (2012.01)
  *G08B 23/00* (2006.01)
  *A01K 1/10* (2006.01)
  *A01K 5/00* (2006.01)
  *A01K 39/00* (2006.01)

(52) U.S. Cl.
  USPC .................. 705/28; 340/573.3; 119/51.02

(58) Field of Classification Search
  USPC .................. 705/28, 1; 340/573.3; 119/51.02
  See application file for complete search history.

(56) References Cited

U.S. PATENT DOCUMENTS

| 5,140,988 | A | * | 8/1992 | Stouffer et al. | 600/437 |
|---|---|---|---|---|---|
| 5,303,708 | A | * | 4/1994 | Stouffer | 600/437 |
| 6,188,989 | B1 | | 2/2001 | Kennedy | |
| 6,346,885 | B1 | * | 2/2002 | Curkendall | 340/572.4 |
| 6,664,897 | B2 | | 12/2003 | Pape et al. | |
| 6,778,872 | B2 | | 8/2004 | Jorgenson et al. | |
| 6,865,542 | B2 | | 3/2005 | Cox et al. | |
| 7,062,262 | B2 | * | 6/2006 | Baird | 455/419 |
| 7,124,108 | B1 | * | 10/2006 | Kimle et al. | 705/37 |
| 7,904,332 | B1 | * | 3/2011 | Merkley et al. | 705/14.1 |
| 2001/0034688 | A1 | | 10/2001 | Annunziata | |
| 2002/0065765 | A1 | | 5/2002 | Shuler et al. | |
| 2002/0069156 | A1 | | 6/2002 | Adam et al. | |
| 2002/0072974 | A1 | * | 6/2002 | Pugliese et al. | 705/14 |
| 2002/0143604 | A1 | | 10/2002 | Cox et al. | |
| 2003/0177025 | A1 | * | 9/2003 | Curkendall et al. | 705/1 |
| 2004/0148217 | A1 | | 7/2004 | Lauring et al. | |
| 2004/0153359 | A1 | | 8/2004 | Ho et al. | |
| 2005/0065862 | A1 | * | 3/2005 | Doubet | 705/28 |
| 2006/0095949 | A1 | * | 5/2006 | Whish-Wilson et al. | 725/105 |
| 2006/0187048 | A1 | * | 8/2006 | Curkendall et al. | 340/572.4 |
| 2007/0011290 | A1 | * | 1/2007 | Schaedle | 709/223 |

FOREIGN PATENT DOCUMENTS

WO    WO 03/058517 A1    7/2003

* cited by examiner

*Primary Examiner* — Seye Iwarere
(74) *Attorney, Agent, or Firm* — Bracewell & Giuliani LLP; Constance G. Rhebergen; Denver S. Bisignano (57) ABSTRACT

A system for managing an integrated supply chain of livestock, such as beef cattle, utilizes a networked system solution for interacting various supply chain entities via the Internet. Various livestock producers, feed yards, packers, retailers, and vendors to the livestock industry are interconnected to communicate, manage, market, and transact the livestock from birth to consumer sales at the retail level. Producers are enabled to provide source verification of their livestock to enhance the integrity of the system, and prequalify livestock for value-added retail programs. Retailers are enabled to make real-time changes to characteristics of known future supply through interactions with the decision makers during the production process.

29 Claims, 9 Drawing Sheets

FIG. 1

| SUPPLY CHAIN MANAGEMENT SYSTEM | | | | | | Welcome |
| --- | --- | --- | --- | --- | --- | --- |
| | | | | | Main Menu  Logout | [Date] |
| Staff Tracker New comments have been added to the Cattle Marketing report for today, [Date] ||||||||
| Membership Management | Packer Management | Show List Management | Trade Capturing | Sales Management | Grid Management | Data Acquisition |

Membership Management — 201
- Full Member Maintenance
- Member Location Manager Maintenance
- Ghost Member Maintenance
- Qualified Member Maintenance
- Location Maintenance
- Location Manager Maintenance
- Administrator Maintenance
- Regional Mgr Maintenance
- CBP Rep Maintenance
- Intern Maintenance
- Staff Tracker

Packer Management — 203
- Manage Packer Show List
- Packer Showlist Settings
- Manage Show List Access
- Buyer Bid Swap
- Packer Maintenance
- Buyer Maintenance
- Plant Maintenance
- Plant/Location Miles Maintenance

Show List Management — 205
- View/Manage Show List — 301
- Enter Showlist Item
- Roll Cattle — 501
- Region Limits
- Manage Projections
- Projections Summary
- Demo Management
- Flag Pens for Preferred Buyer
- Clean Unsold Pens

Reports — 207
- Grid Return Reviews
- Market Situation Report
- Plant Average Grid Returns
- USDA Voluntary Sales Report
- TCFA Sales Report

Buying Program — 209
- Program Sponsor Company Maintenance
- Program Sponsor Company Logos
- Program Sponsor Representative Maintenance
- Program Sponsor Reports
- Launch Page Maintenance
- Program Sponsor Report Analysis
- Message Board
- Category Admin
- Manufacturer Admin
- Product Admin
- Listing Admin

Trade Capturing — 211
- View Trade Page
- View Pre-Trade Page
- Buyer Trade Page
- Packer Trade Page
- Commit Packer Trades
- Forward Contracts
- Print Available Trade Pages
- Print All Trade Pages
- Enter/View Bids
- Print Bids
- Buyer Defaults
- Packer Defaults
- CBP System Settings

Sales Management — 213
- Change Head Count (Sold Cattle)
- Manage Sales
- Market Summary
- Periodic Market Summary
- Release Member
- Release Packer
- Release Grid
- Release Trading

Grid Management — 215
- View Packer Grid
- Grid Setup
- Grid Report
- View Grids
- Creekstone Grid

Data Acquisition — 217
- Download Access DB
- Download Selected tables
- Grid Returns

*FIG. 2*

| SUPPLY CHAIN MANAGEMENT SYSTEM | | | | | | Welcome |
|---|---|---|---|---|---|---|
| | | | | Main Menu | Logout | [Date] |
| Staff Tracker New comments have been added to the Cattle Marketing report for today, [Date] | | | | | | |
| Membership Management | Packer Management | Show List Management | Trade Capturing | Sales Management | Grid Management | Data Acquisition |

View/Manage Show List — 301 — 309

Region: --All Regions-- ☐  Program Status: --All-- ☐

| Date | Steers | Heifers | Mixed | Misc | Totals |
|---|---|---|---|---|---|
| June 20, 2005 | 18,494 | 9,895 | 2,885 | 328 | 31,602 |
| Jun 13, 2005 | 25,480 | 11,557 | 4,582 | 414 | 42,033 |
| Jun 6, 2005 | 22,493 | 9,564 | 3,785 | 824 | 36,666 |
| May 30, 2005 | 21,325 | 11,600 | 4,007 | 233 | 37,165 |
| May 23, 2005 | 22,110 | 12,708 | 4,223 | 672 | 39,713 |
| May 16, 2005 | 16,613 | 9,492 | 4,113 | 461 | 30,697 |
| May 9, 2005 | 17,024 | 8,552 | 3,700 | 195 | 29,471 |
| May 2, 2005 | 19,758 | 10,947 | 5,027 | 435 | 36,167 |
| Apr 25, 2005 | 17,498 | 10,049 | 5,464 | 1,356 | 34,367 |
| Apr 18, 2005 | 18,774 | 8,967 | 2,858 | 778 | 31,377 |
| Apr 11, 2005 | 19,475 | 9,811 | 2,877 | 393 | 32,556 |
| Apr 4, 2005 | 18,564 | 10,760 | 3,209 | 0 | 32,533 |
| Mar 28, 2005 | 14,760 | 10,796 | 2,948 | 1,042 | 29,546 |
| Mar 21, 2005 | 15,955 | 12,426 | 2,937 | 89 | 31,407 |
| Mar 14, 2005 | 12,507 | 10,166 | 3,065 | 463 | 26,201 |
| Mar 7, 2005 | 14,609 | 12,029 | 3,049 | 479 | 30,166 |
| Feb 28, 2005 | 13,637 | 12,140 | 3,360 | 288 | 29,425 |
| Feb 21, 2005 | 13,184 | 10,688 | 2,610 | 828 | 27,310 |
| Feb 14, 2005 | 11,805 | 11,568 | 2,926 | 127 | 26,426 |
| Feb 7, 2005 | 13,038 | 9,771 | 3,364 | 360 | 26,533 |
| Jan 31, 2005 | 13,543 | 11,179 | 2,688 | 200 | 27,610 |
| Jan 24, 2005 | 18,890 | 12,003 | 3,047 | 745 | 34,685 |
| Jan 17, 2005 | 9,935 | 8,697 | 2,704 | 269 | 21,605 |
| Jan 10, 2005 | 16,551 | 11,479 | 2,357 | 473 | 30,860 |
| Jan 3, 2005 | 14,435 | 13,531 | 2,264 | 499 | 30,729 |
| Dec 27, 2004 | 11,476 | 8,787 | 3,271 | 816 | 24,350 |
| Dec 20, 2004 | 10,317 | 7,363 | 2,680 | 450 | 20,810 |
| Dec 13, 2004 | 16,093 | 13,539 | 2,625 | 330 | 32,587 |
| Dec 6, 2004 | 12,213 | 13,766 | 3,065 | 285 | 29,329 |
| Nov 29, 2004 | 10,812 | 10,199 | 3,027 | 275 | 24,313 |
| Nov 22, 2004 | 11,859 | 11,267 | 4,159 | 1,408 | 28,693 |

Previous    Next

*FIG. 3*

| SUPPLY CHAIN MANAGEMENT SYSTEM | | | | | | Welcome |
|---|---|---|---|---|---|---|
| | | | | | Main Menu  Logout | [Date] |
| Staff Tracker New comments have been added to the Cattle Marketing report for today, [Date] | | | | | | |
| Membership Management | Packer Management | Show List Management | Trade Capturing | Sales Management | Grid Management | Data Acquisition |

Show List                               401

--All SV-- ☐  --Select Packer--  ☐  --Region--                    ☐ Submit Changes
Print Version

Show List Details                                  Listing for week of [Date]

Seq Num    Lot        Pen        Head  Sex     In Wt  DOF
              ─ 405                              ─ 407
                                                       ─ 403
         Cattle Company #1 Anywhere
601   ☐ 0      601     135   Steers   600   210
703   ☐ 0      703      46   Steers   700   170
819   ☐ 0      819      80   Steers   775   120
827   ☐ 0      827     155   Steers   650   165
828   ☐ 0      828     155   Steers   650   165
909   ☐ 0      909      70   Steers   700   150
                    Total Head 641

Cattle Company #2 Anywhere
101   ☐ 0      101      93   Steers   585   194
105   ☐ 0      105      54   Heifers  525   245
107   ☐ 0      107-109 144   Steers   575   245
                    Total Head 291

Cattle Company #3 Anywhere
         Trade Contact: Clint McWaters at (308) 631-1215 or (307) 532-5402
  8   ☐ 0        2      80   Steers
 20   ☐ 0       20     225   Steers
                    Total Head 305

Cattle Company #4 Anywhere
       ☐ 294    A07          40   Heifers  610   181
       ☐ 199    A24          89   Heifers  533   258
       ☐ 267    A38,B28,D06  640  Mixed    628   199
       ☐ 230    C34          38   Heifers  625   227

| SUPPLY CHAIN MANAGEMENT SYSTEM | | | | | | Welcome |
|---|---|---|---|---|---|---|
| | | | | | Main Menu Logout | [Date] |

Staff Tracker New comments have been added to the Cattle Marketing report for today, [Date]

| Membership Management | Packer Management | Show List Management | Trade Capturing | Sales Management | Grid Management | Data Acquisition |
|---|---|---|---|---|---|---|

Enter Showlist Item

Member Information
Location --Select Location-- ☐      Member --Select Member Company--
Qualified --Select Qualified-- ☐      Control

Cattle Information
| | | | |
|---|---|---|---|
| Lot | | In Date ☐ ☐ | ☐ |
| Pen | | Days on Feed | |
| Pen Seq | | Avg Live Weight | |
| Head Count | | Feed Background --Select Background--☐ | |
| Sex Class | Steers ☐ ☐ | Dressing Pct | |
| Show Week | June 20, 2005 ☐ | First Implant | ☐ |
| In Weight | | Second Implant | ☐ |

Cattle Performance

CUTABILITY           QUALITY
| Yield 1 | 0 | % | Prime | 0 | % |
|---|---|---|---|---|---|
| Yield 2 | 0 | % | Choice | 50 | % |
| Yield 3 | 100 | % | Select | 50 | % |
| Yield 4 | 0 | % | No Roll | 0 | % |
| Yield 5 | 0 | % | Substandard* | 0 | % |

*Includes Hard Bones and other Non-Graded categories.

Yield Totals    %          Yield Totals   %    %

MISC
| CAB | 0 | % | Darks | 0 | % |
|---|---|---|---|---|---|
| Heavies | 0 | % | Lights | 0 | % |

Stipulations
Must Sell    No         Cattle Hedged    No
This Week?   Yes                        Yes Marketing Pref. ☐ Cash       Preferred Buyer
                 ☐ In The Beef
                 ☐ Grid
                 ☑ No Preference Pen Description If the pen is not source verified, click the "Enroll Pen" button below to submit the pen.
                            Enroll Pen     Cancel Pen

Source Verification
| | | | |
|---|---|---|---|
| PIN Code Apply for PIN Code | ☐ | My Source List --Select Source-- | ☐ |
| Status Unknown | | Ranch of Origin | |
| Supplier Name | | Ranch Contact | |
| Supplier City | | Ranch Address | |
| Supplier State --Select State-- | ☐ | Ranch City | |
| Supplier Type --Select Type-- | ☐ | Ranch State --Select State-- | ☐ |
| Lot | | Ranch Zip Code | |
| Pen | | Ranch Phone | |
| Head | | Ranch Fax | |
| Sex Class --Select Class-- | ☐ | Calving Start Date ☐ ☐ ☐ | |
| Show Week June 20, 2005 | | Calving End Date ☐ ☐ ☐ | |
| Source --Select Source-- | ☐ | Breed Type --Select Breed Type-- | ☐ |
| Number of Sources | | Other | |
| Purchased From --Select Option-- | ☐ | Method of ID --Select Method-- | ☐ |
| Other | | Other | |
| | | Tag Numbers | |

Comments

Submit      Cancel

*FIG. 5*

601 http://trade20 - Avant Browser

File Edit View Navigation Groups Favorites Feeds Tools Windows Help

Address: http://trade20

Sales Listing Showing [Active & Associates] [--All Regions--] [--All SV--]

Sale Week [Date] [--All Packers--] [--All Delivery Points--] [--All Locations--]

Edit Sales

Sales Listing for Week of [Date]

| Pen Lot | Head | Sex | W | Location | Packer | Method | Price | PxLimit | Delivery | Comment | | |
|---------|------|-----|---|----------|--------|--------|-------|---------|----------|---------|---|---|
| 304 0 | 82 | Steers | 1150 | Anywhere | Anyone | Grid | 141.50 | | Anyplace | | Reverse | Modify |
| 607 0 | 65 | Heifers | 1150 | Anywhere | Anyone | Grid | 141.50 | | Anyplace | | Reverse | Modify |
| 710 0 | 66 | Steers | 1150 | Anywhere | Anyone | Grid | 141.50 | | Anyplace | | Reverse | Modify |
| 711 0 | 66 | Steers | 1150 | Anywhere | Anyone | Grid | 141.50 | | Anyplace | | Reverse | Modify |
| 810 0 | 50 | Heifers | 1150 | Anywhere | Anyone | Grid | 141.50 | | Anyplace | | Reverse | Modify |
| 822 0 | 62 | Steers | 1150 | Anywhere | Anyone | Grid | 141.50 | | Anyplace | | Reverse | Modify |
| 1104 0 | 40 | Heifers | 1150 | Anywhere | Anyone | Grid | 141.50 | | Anyplace | | Reverse | Modify |
| Head Count 431 | | | | | | | | | | | | |
| H-07 4275 | 55 | Heifers | 1180 | Anywhere | Anyone | Cash | 88.00 | | Anyplace | | Reverse | Modify |
| Head Count 55 | | | | | | | | | | | | |
| 316 0 | 99 | Heifers | 1300 | Anywhere | Anyone | Cash | 1234.00 | | | Contact Cattle | Reverse | Modify |
| Head Count 99 | | | | | | | | | | | | |
| G6 4208/422573 | | Holstein | 1350 | Anywhere | Anyone | Cash | 82.00 | | | | Reverse | Modify |
| Head Count 73 | | | | | | | | | | | | |
| A-07 0 | 197 | Steers | 1150 | Anywhere | Anyone | Grid | 141.50 | 91.00 | Anyplace | | Reverse | Modify |
| B-08 0 | 255 | Mixed | 1150 | Anywhere | Anyone | Grid | 141.50 | 88.00 | Anyplace | | Reverse | Modify |
| F-06 0 | 54 | Mixed | 1150 | Anywhere | Anyone | Grid | 141.50 | 88.00 | Anyplace | | Reverse | Modify |
| F-09 0 | 245 | Steers | 1150 | Anywhere | Anyone | Grid | 141.50 | 91.00 | Anyplace | | Reverse | Modify |
| N-06 0 | 137 | Steers | 1150 | Anywhere | Anyone | Grid | 141.50 | 91.00 | Anyplace | | Reverse | Modify |
| P-03 0 | 192 | Steers | 1150 | Anywhere | Anyone | Grid | 141.50 | 91.00 | Anyplace | | Reverse | Modify |
| P-04 0 | 130 | Steers | 1150 | Anywhere | Anyone | Grid | 141.50 | 91.00 | Anyplace | | Reverse | Modify |
| O-06 0 | 140 | Steers | 1150 | Anywhere | Anyone | Grid | 141.50 | 91.00 | Anyplace | | Reverse | Modify |
| Head Count 1350 | | | | | | | | | | | | | http://trade.com

*FIG. 6*

Supply Chain Management System
Supplier Source Verification Form

Supplier Information ⟋ 705
Name: Cattle Co. #1
City: Anywhere
State: TX

Ranch of Origin ⟋ 707
Name: ABC Ranch
Contact: A.B. Owner
Address P.O. Box 1234
City, State, Zip: Anywhere NM, 88415
Phone: 325-???-????
Fax: 325-???-????

Listing Information ⟋ 703
Lot: 218
Pen: J-16
Head: 150
Sex Class: Mixed
Show Week: [Date1]
Source: Single
Number of Sources: 1
Purchased From: Original Owner
Calving Start Date: [Date2]
Calving End Date: [Date3]
Breed Type: Okie
Method of Identification: Tag System
Tag Numbers: 1

701

Comments  The actual breed makeup is English Exotic Cross with a touch of ear. The ID method is a ranch lot tag w/serial numbers.

Signed By: A.B. Owner          Date: [Date4]

SYSTEM, METHOD, AND APPARATUS FOR SUPPLY CHAIN MANAGEMENT

BACKGROUND OF THE INVENTION

1. Technical Field

The present invention relates in general to a supply chain management system and, in particular, to an improved system, method, and apparatus for managing an integrated supply chain of livestock such as beef cattle via a networked system solution.

2. Description of the Related Art

Livestock producers, from seed stock producers to feedlot operators, are responsible for the quality and safety of livestock products available to the consuming public. In order to assist producers in employing management strategies and techniques to produce better products, livestock quality assurance programs were developed. Such programs are typically state managed educational efforts geared at promoting the production of safe, wholesome, and high quality products by producers. These efforts focus on management practices relative to feed and sources, feed additives and medications, individual treatments, record keeping, carcass quality, and care and husbandry practices that can be put into place by all producers to prevent safety and quality defects in beef products.

Recently, there has also been considerable effort to develop livestock management practices that incorporate modern technology to upgrade the levels of quality, production, and value to the various participants in the livestock supply chain. However, most of these efforts focus on only one or a few of the entities in the supply chain. The supply chain in the beef industry has been substantially disconnected from an integrated management standpoint. Beef processors began to work with retailers on a limited basis with the advent of boxed beef, and then began to work more closely with those retailers as opportunities for further processing products developed over time. Today, beef processors have further increased their involvement in the supply chain through owning and/or contracting livestock. They do not maintain and operate an integrated network system solution whereby retailers are able to meet consumer demand preferences by being involved in the real-time decision making process at the livestock production level.

Beef producers have had an even more limited participation in supply chain management processes. There have been several producer groups that developed alliances involving retailers over the last 10 years. However, these alliances have been limited to producers and the like agreeing to supply a contracted amount of product for a given period of time. Product improvement adjustments in these types of arrangements are typically made on a periodic basis and outside of an integrated management system. To date, there have been no attempts to facilitate a comprehensive supply chain management system that incorporates all of the participants in the supply chain. Thus, an improved management and communications tool that services and manages an integrated supply chain of livestock via a networked system solution would be desirable.

SUMMARY OF THE INVENTION

One embodiment of the present invention comprises a system, method, and apparatus for managing an integrated supply chain of livestock, such as beef cattle, that utilizes a networked system solution for interaction in decision-making processes via the Internet. Various livestock producers (e.g., owners and/or operators of cow/calf, stocker, and feeding/finishing operations such as feed yards, etc.), retailers (e.g., grocery stores, supermarkets, food service providers, purveyors and merchandisers, etc.), and numerous types of intermediaries to the livestock industry (e.g., vendors, packers, etc.) are interconnected to communicate, manage, market, and transact the livestock from as early as birth all the way to consumer sales at the retail level. Producers are enabled to provide source verification of their livestock to enhance the integrity of the system, and prequalify livestock for value-added retail programs such specialty labeled beef products.

The present invention provides a comprehensive networked system solution to allow retailers to interact with finished cattle information to develop product promotion and pricing strategies, as well as complete supply forecasting objectives. Retailers may prescribe numerous livestock attributes for the various upstream supply chain participants including, for example, nutrition, health, palatability, appearance, packaging, etc., that are fulfilled at appropriate times by the upstream participants to create and define desirable parameters for consumers. The system also provides historical, benchmark, and seasonal information to the various types of users.

External vendors to the livestock supply chain may participate in a Web services-based (e.g., Internet) buying program that enable producers and like to automatically coordinate real time management of their supplies inventory. Moreover, other vendors may provide important industry information and sponsored reports to the supply chain members subject to approval of the overall system administrator or system manager.

The system administrator adds value by providing means for interconnecting these various entities to cooperatively facilitate interaction, communication, control, and management of the livestock in real time. The system administrator may include persons, entities, and/or automated systems for administering and managing the networked system solution.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

FIG. 2 is a graphical depiction of one embodiment of a web page utilized by the system of FIG. 1, illustrating a main menu thereof;

FIG. 3 is a graphical depiction of one embodiment of a web page utilized by the system of FIG. 1, illustrating a show list thereof;

FIG. 5 is a graphical depiction of one embodiment of a web page utilized by the system of FIG. 1, illustrating the data entry fields for a show list item;

FIG. 6 is a graphical depiction of one embodiment of a web page utilized by the system of FIG. 1, illustrating a sales listing showing;

DETAILED DESCRIPTION OF THE INVENTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art.

Referring to FIGS. 1-7, one embodiment of a system for managing an integrated supply chain of livestock, such as beef cattle, is shown. The system 101 (FIG. 1) comprises one or more producers 103, intermediaries 105, and retailers 107. Each of the producers 103 produces livestock, including feeding and caring for the livestock. The producers 103 may comprise seedstock and cow/calf operations, stockers, and feeders. The intermediaries 105 facilitate processing of the livestock to become finished product. The retailers 107 retail finished product derived from the livestock for sales to consumers 108. The retailers 107 may include retail entities and wholesalers, such as food service entities that distribute and market beef products to institutions (e.g., military, schools, airports, etc.).

Figure 1:
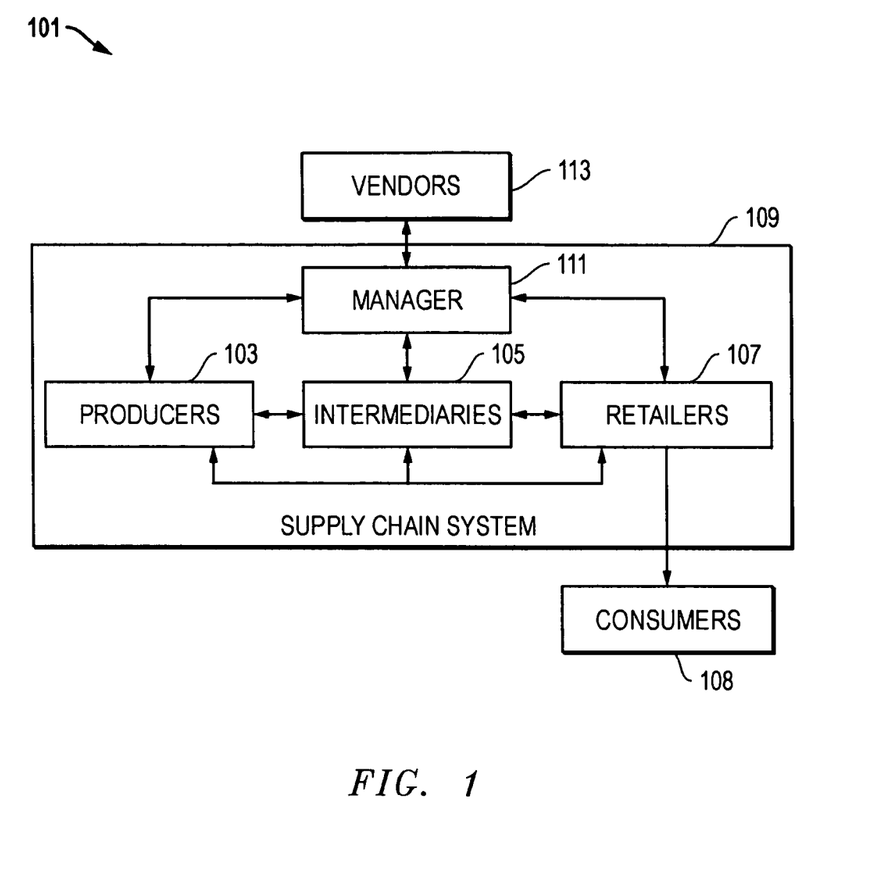
FIG. 1 is a high level flow diagram of one embodiment of a system constructed in accordance with the present invention.
Figure 4:
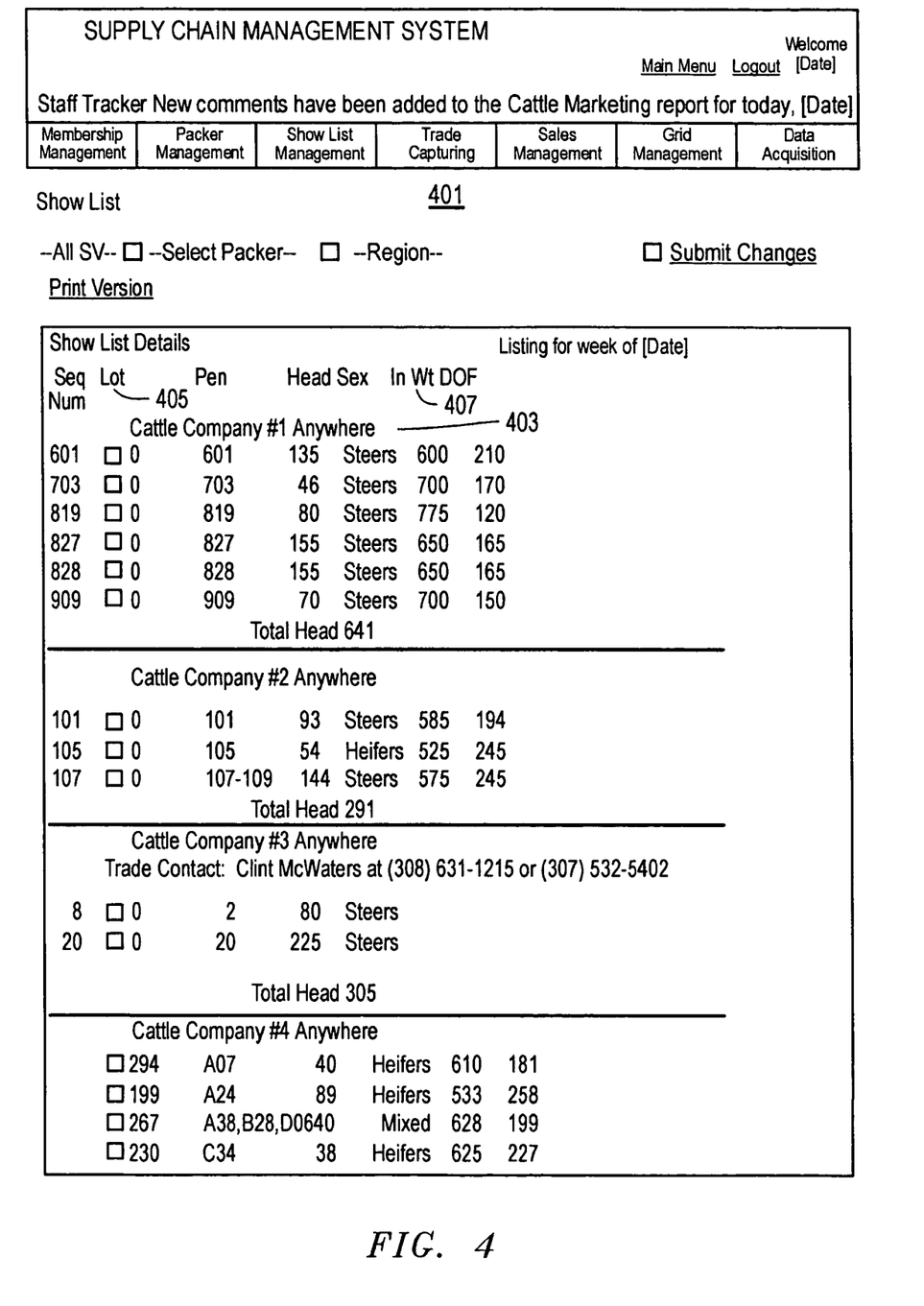
FIG. 4 is a graphical depiction of one embodiment of a web page utilized by the system of FIG. 1, illustrating management of show lists.
Figure 7:
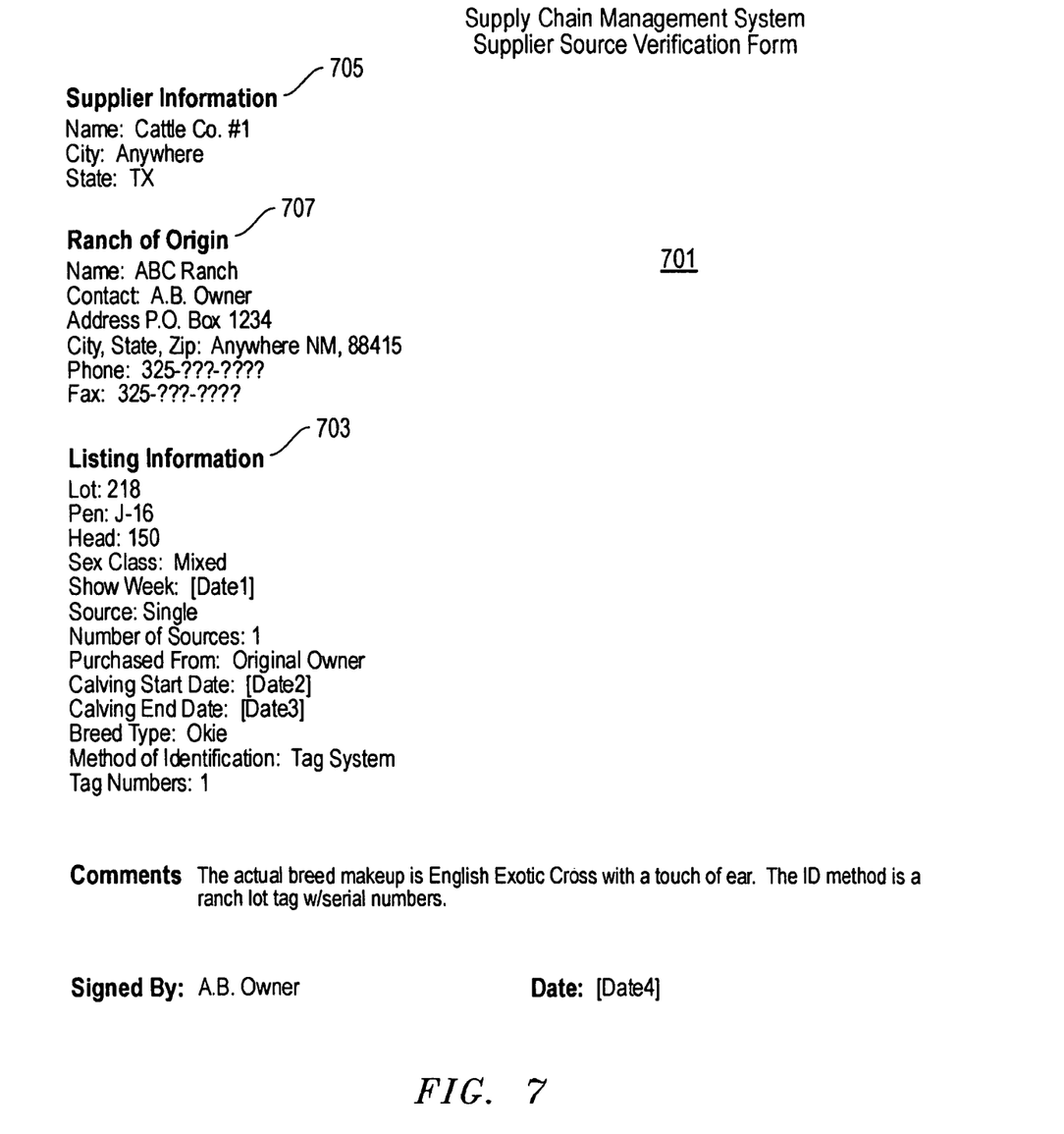
FIG. 7 is a graphical depiction of one embodiment of a web page utilized by the system of FIG. 1, illustrating a supplier source verification form.

A network system 109 is used to facilitate interaction between the producers 103, intermediaries 105, and retailers 107 via the Internet such that they are all interconnected to communicate, manage, market, and transact the livestock. A system administrator 111 manages the network system 109 and relationships between the producers, intermediaries, and retailers regarding the livestock. The livestock may be transacted on the network system 109 from pre-birth through sales of finished product at a consumer retail level. The system further provides historical, benchmark, and seasonal information to users thereof.

FIG. 2 depicts one embodiment of webpage used to facilitate the present invention. The webpage allows users to manage their membership 201, packer management 203, livestock show list management 205, access to reports 207 and buying programs 209, trade capturing 211, sales management 213, grid management 215, and data acquisition 217. FIG. 3 depicts one type of webpage 301 for "View/Manage Show List" in show list management 205. Webpage 301 illustrates various show list details that may be sorted by date, type, producer, etc., and typically includes dates 303, livestock types 305, and totals 307 as shown. As will be described in greater detail below, "Program Status" 309 or custom retail programs also may be accessed to sort the livestock by program. From webpage 301, various detailed webpages, such as a show list 401 (FIG. 4) for a specific week, may be viewed by category as described above, including producer information 403, livestock location 405, and livestock information 407.

In one embodiment, the producers 103 provide source verification (FIG. 7) of their livestock comprising on-line sworn affidavits 701 attesting to livestock listing information 703, including, for example, supplier information 705, type of livestock, origin and source information 707 (e.g., firm/ranch name, contact info such as names addresses phone and fax numbers), physical identification methods (e.g., tag systems, DNA testing, and retinal scanning), calving methods, calving dates, etc. The system also fulfills export document requirements with the network system to facilitate international transactions of livestock to foreign countries outside of the United States. These export documents and requirements are managed by the database, the network interfaces, and the integrated system, instead of the prior art paper-based systems. The specific information about the livestock may be entered as shown in FIG. 5 on webpage 501.

As stated above, the present invention may further comprise custom retail programs. One example of a webpage 601 for a custom retail program is shown in FIG. 6, and includes a listing of cattle belonging to a particular program. Programs may be defined by retailers 107, for which livestock produced by the producers is prequalified for adding value thereto. The custom retail programs include qualifying the livestock based on attributes of the livestock comprising nutrition and feeding protocols, health and medication protocols, palatability, appearance, designation as "all natural" products, product tenderness, product selection attributes, specialty labeled meat products, and packaging. The producers qualify for the custom retail programs by fulfilling a set of production protocols that are communicated in the network system and interacted with by the system administrator and retailers.

The custom retail programs may be selected by the producers subject to approval of and qualification by the system administrator and, in the alternative, the system administrator selects the custom retail programs for the producers to increase livestock value to the producers. The system administrator qualifies the livestock for the custom retail programs by physically inspecting the livestock in-person at a physical location of the livestock. The decisions by the system administrator are implemented and the livestock is managed by the network system in response thereto. Alternatively, the livestock can be qualified by remote inspection via the Internet wherein the system administrator is in a different physical location than the livestock. In addition, the custom retail programs include specifications for prescribing genetics of the livestock such that attributes of the livestock are prescribed prior to conception of the livestock.

The livestock attributes may be grouped into the following five general categories: health/wholesomeness/safety, palatability, appearance, packaging, and other attributes. At least some elements in each of these categories can be or are directly influenced by the system administrator, in addition to the entity responsible for controlling the livestock at that time. Each of these categories includes numerous subcategories. For example, the category of "health/wholesomeness/safety" includes, but is not limited to, hormone usage, antibiotic usage, organic, shelf life, feed (e.g., practices, rations, gmo's, additives, etc.), balanced, nutritional value/enhancement (such as carbohydrates, cholesterol/trans-fatty acids, fat, vitamins (e.g., B-complex, etc.), minerals (e.g., zinc, iron, etc.), protein, etc.), and food safety (e.g., pathogen/bacteria control, pesticides, chemical additives, animal disease, etc.).

The "palatability" category includes flavor (e.g., natural flavor enhancements, marinade or solutions, etc.), tenderness, juiciness, and texture. The category of "appearance" includes lean color, visible fat, etc. The "packaging" category includes nutritional information, packaging type (e.g., vacuum, modified atmosphere, over wrap, etc.), packaging/production dates, cooking instructions, and recipes. Finally, the "other" category includes periodic (e.g., quarterly) programs that include producer identification and dish/recipe, traceability/source verification, producer image/confidence, packer and processor image/confidence, cattle age/age verification, animal care/handling, environmental impact, convenience (e.g., easy/quick to prepare, pre-cooked, marinade, pre-spice/flavor, fresh beef), value (such as price/quality relationship, etc.), country of origin, authentic (e.g., product produced by real cattlemen instead of corporate, product that originates from the original cattle industry, etc.) and product.

In one embodiment, the retailers 107 interact with finished cattle information to develop product promotion and pricing strategies, to complete supply forecasting objectives, and to request handling parameters controlled by the producers and intermediaries for the livestock in custom retail programs originated by the retailers. The retailers may prescribe attributes of the livestock for the various upstream supply chain participants, including the producers and intermediaries. The producers and intermediaries make changes within the system to fulfill the attributes to create and define desirable parameters for consumers. The producers review feedback regarding the value added by the attribute fulfillment to make their future livestock management decisions.

As shown in FIG. 1, the intermediaries may comprise vendors 113 that are external to the livestock supply chain. These vendors 113 provide an automated, Internet services-based buying program that enables producers 103 and other intermediaries 105 to automatically coordinate real time management of their supplies inventory. The supplies inventory includes pharmaceutical products, feeding equipment, animal handling equipment, animal identification equipment, feed ration components, fuel and energy inputs, and the like. The network system enables vendors 113 to monitor, manage, and implement decisions for the supplies inventory to facilitate fulfillment of livestock attributes prescribed by the retailers, including managing product orders, monitoring and reacting to customer inventory levels, and managing shipment and delivery communications and decisions to customers.

In one embodiment, the intermediaries comprise vendors 113 that provide decision support information, such as livestock industry information, network intelligence, and sponsored reports to the producers, other intermediaries, and retailers. The decision support information is subject to approval of the system administrator 111 through an interactive reporting within the network system 109 whereby the producers 103, other intermediaries 105, and retailers 107 interact with the decision support information to make livestock management decisions. The system generates interactive reports and messages to inform participants of critical information. It appears as a link or a scroll and contains comments that are important to the recipients, and is a real-time reporting process.

Figure 8:
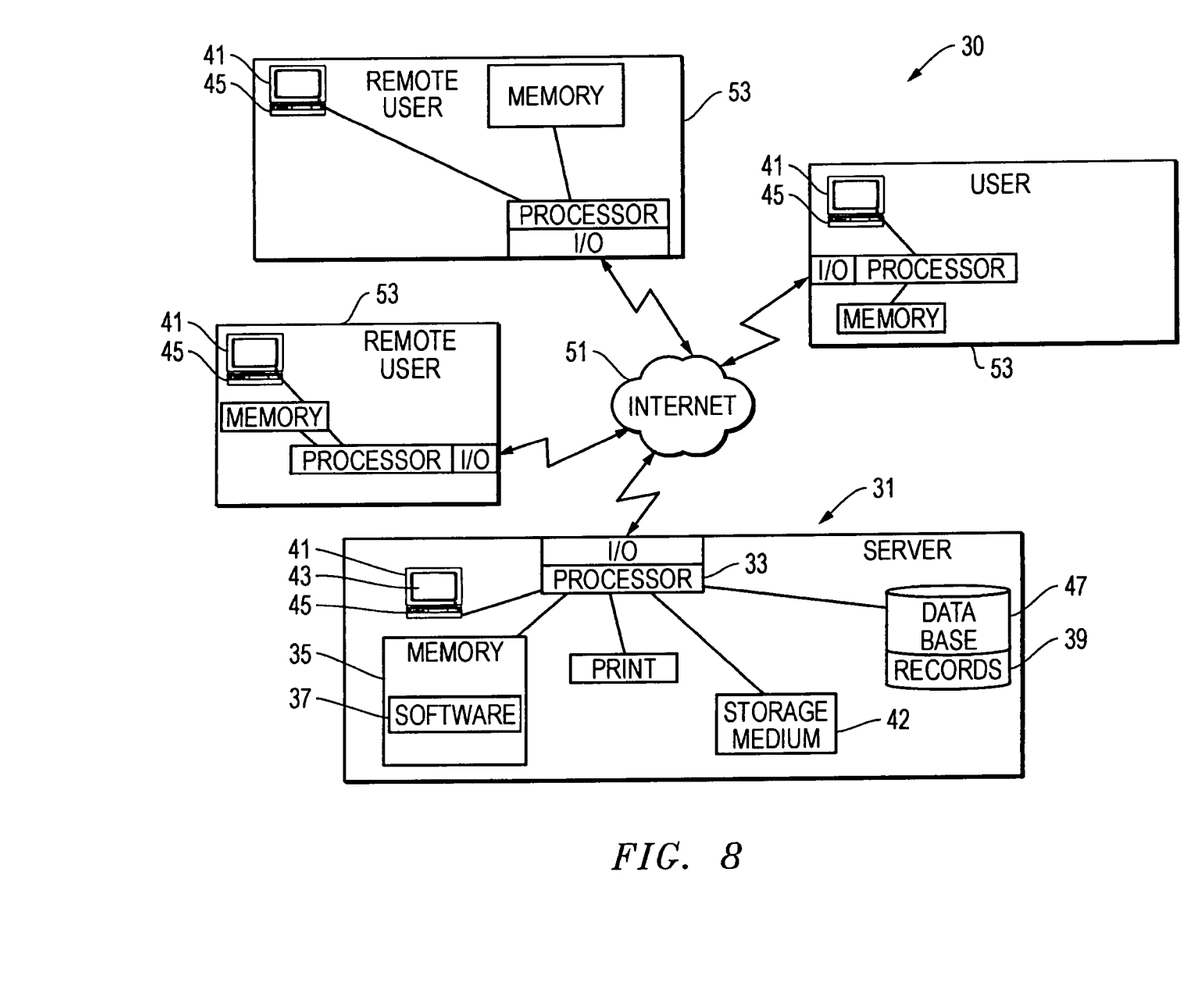
FIG. 8 is a high level block diagram of an illustrative Internet environment in which the present invention may be practiced.

With reference now to FIG. 8, there is illustrated an exemplary Internet environment in which the present invention may be practiced. Embodiments of the present invention advantageously provide a system and methods that may be facilitated on the Web. Embodiments of the present invention also include a computer readable medium containing a set of instructions or program causing a computer system to facilitate according to the present invention, and a database of business networks formed by users of the computer system.

The system 30 includes a computer system positioned at a site to define one or more servers or server modules 31 for the system administrator or manager. In one embodiment, the server 31 is actually a module having two separate types of machines to provide processing/server capability for two functionalities. One of these functionalities is that of web/application processing, and the other is that of database processing. The web/application requirements functionality of the server 31 is furnished by a web/application server. The web/application servers are connected to a database server or server cluster that provides the database functionality. The database servers of server module 31 are attached to a high performance storage device, as will be described.

The set of instructions 37 also causes the processor to form and forward for retention and further use a set of database records 39. A graphical display 41 is coupled to the processor 33 for displaying graphical images 43, and a user interface 45 coupled to the processor 33 to provide a user access to manipulate the software 37 and database records 39. An embodiment of the present invention also advantageously provides software stored on storage media 42.

It should be understood that the embodiment described is given by way of example and that other types of servers or computers may be used. The server shown schematically at 31 represents a server, server cluster, or server farm in the architecture and is not limited to any individual physical server. The server site may be deployed as a server farm or server cluster managed by a server hosting provider. The number of servers and their architecture and configuration may be increased based on usage, demand and capacity requirements for the system 30.

The system 30 further includes in database 47 or a set or grouping of databases stored in the memory of the server 31 or in other suitable data storage media accessible to the server 31. The database 47 may also be provided in the form of a database server or server cluster. The particular database configuration is replicated based on capacity requirements for the system 30. The database 47 or databases further include at least a plurality of records 39 having data relating to the users and to the personal networks and business networks formed by users of the computer system. The system 30 further includes software 37 stored in memory 35 of the server 31 to process information within the system 30. The software 37 allows the server 31 to interface with users and generally allows the users to operate the computer system 30 according to the present invention for electronic commerce using networks to create a community of interconnected entities. The software instructions 37 allow a user to inquire about data or information from database 37 or the system 30.

The software or set of instructions 37 according to the present invention may be stored in a machine-readable storage medium, such as, but not limited to, any type of computer data storage disk including floppy disks, CD-ROMs, optical disks, magneto-optical disks, read-only memories (or ROMs), EPROMs, EEPROMs, random access memories (RAMs), magnetic or optical cards, or other types of media suitable for storage of a set of instructions that, when executed by the server 31, cause the server to perform the operations of the present invention.

The program set of instructions described in the present invention are not inherently related to or required by a particular computer or other server hardware. Various conventional computers or servers may be used according to the present invention. In addition, the present invention is not described with reference to any particular programming language. It will be understood that a variety of programming languages may be used to implement the system and method of the present invention as described herein. All software and all hardware used to implement the invention may be adapted to adjust for future improvements and advancements in technology that may be adapted by the system administrators to achieve improved effectiveness of the system.

In one embodiment of the present invention, the system 30 interfaces the area network or Internet 51 by communicating through the server 31, and a plurality of remote user computers 53 (e.g., producers, intermediaries, retailers, etc.) in communication with the Internet 51, positioned remote from the server 31 at a user site, and positioned to access the server 31. The user computer 53 is typically a personal computer and may be connected over the Internet through a variety of configurations, such as through a stand-alone computer with individual access, or though a local area network (LAN) or wide area network (WAN). Access to the server 30 by the user computers may be made by a variety of communication links such optical cable, a wireless network such as a cellular network, satellite network or other access media. In another embodiment, network protocols may utilize secure socket layer technology and dynamic data encryption to grant/approve access to the system for any authorized user attempting to gain access at any time.

When in communication with the server 31 through the Internet 51, the remote user computer 53 can access the software 37 for various purposes. The remote user computer 53 can retrieve records 39 from the server database 47 for display and user manipulation. The system 30 can also include still other devices 55, such as a portable computer, a PDA, a mobile telephone, and still other devices for accessing the Web, that are adapted to interface with the Internet 51 while positioned remote from the server 31.

Figure 9:
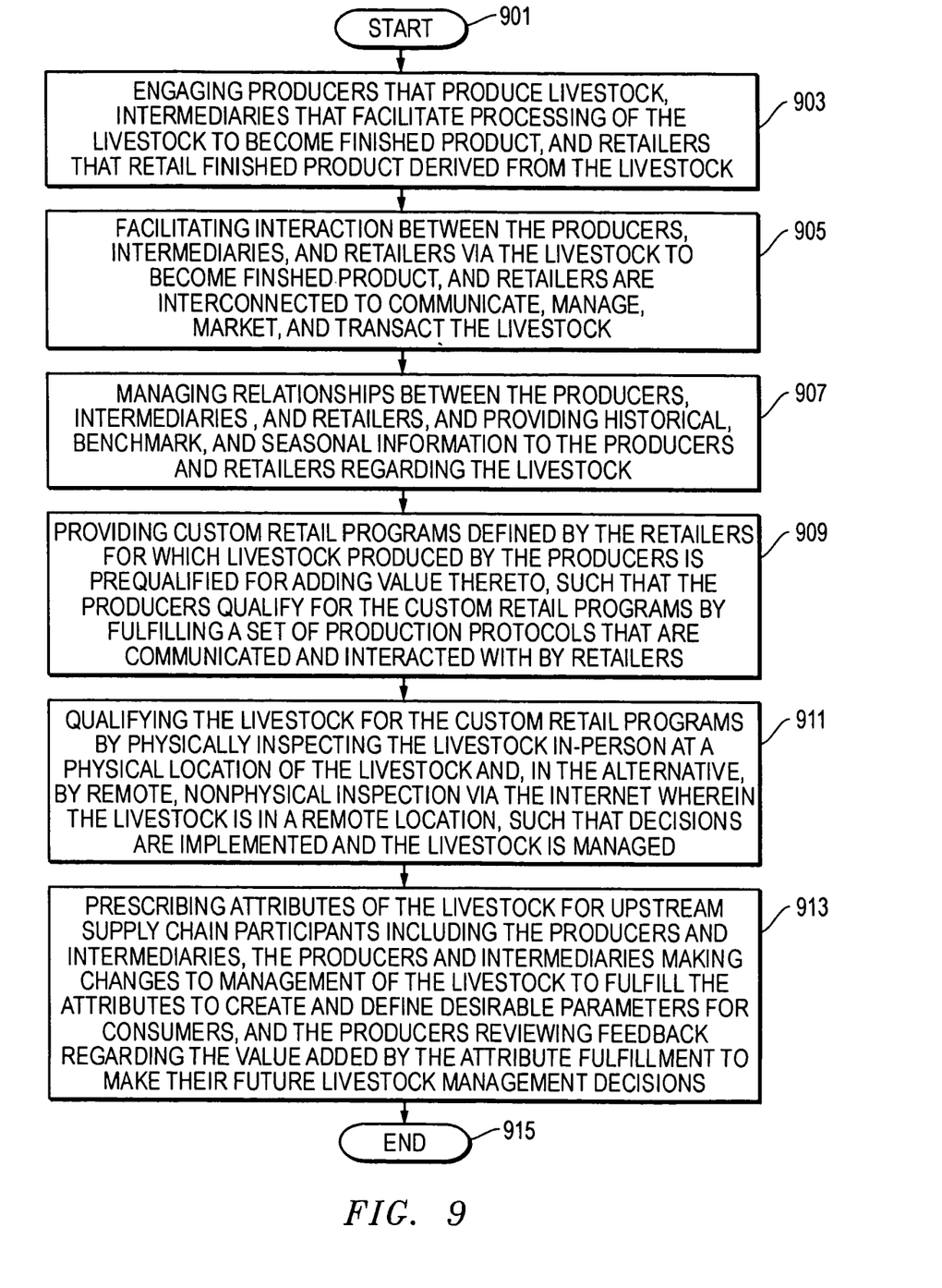
FIG. 9 is a high level flow diagram of one embodiment of a method constructed in accordance with the present invention.

Referring now to FIG. 9, one embodiment of a method of managing an integrated supply chain of livestock is illustrated. The method begins as shown at block 901, and comprises engaging producers that produce livestock, intermediaries that facilitate processing of the livestock to become finished product, and retailers that retail finished product derived from the livestock (step 903); facilitating interaction between the producers, intermediaries, and retailers via the Internet such that the producers, intermediaries, and retailers are interconnected to communicate, manage, market, and transact the livestock (step 905); managing relationships between the producers, intermediaries, and retailers, and providing historical, benchmark, and seasonal information to the producers and retailers regarding the livestock (step 907); providing custom retail programs defined by the retailers for which livestock produced by the producers is prequalified for adding value thereto, such that the producers qualify for the custom retail programs by fulfilling a set of production protocols that are communicated and interacted with by retailers (step 909); qualifying the livestock for the custom retail programs by physically inspecting the livestock in-person at a physical location of the livestock and, in the alternative, by remote, non-physical inspection via the Internet wherein the livestock is in a remote location, such that decisions are implemented and the livestock is managed (step 911); and prescribing attributes of the livestock for upstream supply chain participants including the producers and intermediaries, the producers and intermediaries making changes to management of the livestock to fulfill the attributes to create and define desirable parameters for consumers, and the producers reviewing feedback regarding the value added by the attribute fulfillment to make their future livestock management decisions (step 913); before ending as indicated at step 915.

The present invention may be varied as described above in the preceding paragraphs. For example, the method may comprise engaging producers such as seedstock and cow/calf operations, stockers, and feeders, the intermediaries include packers and vendors to a livestock industry, and the retailers include retailers and wholesalers. The method may further comprise enabling the producers to provide source verification of their livestock comprising on-line sworn affidavits attesting to livestock listing information, including type of livestock, origin and source information, physical identification methods, calving methods, and calving dates; and fulfilling export document requirements to facilitate international transactions of livestock to foreign countries outside of the United States.

The present invention has several advantages, including the ability to manage an integrated supply chain of livestock with a networked system solution for interaction via the Internet. Producers, intermediaries, retailers, and vendors are interconnected to communicate, manage, market, and transact the livestock. Producers are enabled to provide source verification of their livestock to enhance the integrity of the system, and prequalify livestock for value-added retail programs. Retailers interact with finished cattle information to develop product promotion and pricing strategies, as well as complete supply forecasting objectives. Retailers also prescribe numerous livestock attributes for the various upstream supply chain participants. The system provides historical, benchmark, and seasonal information to users. External vendors to the livestock supply chain participate in a Web services based buying program that enable producers to automatically coordinate real time management of their supplies inventory. Other vendors provide important industry information and sponsored reports to the supply chain members. The system administrator interconnects these entities to cooperatively facilitate interaction, communication, control, and management of the livestock in real time.

While the invention has been shown or described in only some of its forms, it should be apparent to those skilled in the art that it is not so limited, but is susceptible to various changes without departing from the scope of the invention. For example, the present invention is also well suited for livestock-derived product applications as well, including offal, animal hides, etc.

What is claimed is:

1. A network system for managing an integrated supply chain of livestock comprising a plurality of producers each producing livestock, including feeding and caring for the livestock, a plurality of intermediaries for facilitating processing of the livestock to become finished product, and a plurality of retailers each retailing finished product derived from the livestock, the system comprising:

a network system for facilitating interaction between the producers, intermediaries, and retailers via the Internet such that the producers, intermediaries, and retailers are interconnected to communicate, manage, market, and transact the livestock, the network system comprising:

means for a system administrator to manage the network system and relationships between the producers, intermediaries, and retailers regarding the livestock, and means for the producers to receive a real time input from retailers, so the one of the producers can change a characteristic of a future supply of the livestock as desired by the respective retailer.

2. A system according to claim 1, wherein the change to a characteristic of a future supply of the livestock comprises an adjustment in a livestock management practice that is selected from the group consisting of a change in hormone usage of the livestock, a change in antibiotic usage of the livestock, a change in a feed of the livestock, a change in a nutritional value provided to the livestock, and combinations thereof.

3. A system according to claim 1, wherein the livestock is transacted on the network system from pre-birth through sales of finished product at a consumer retail level.

4. A system according to claim 1, wherein the producers provide source verification of their livestock comprising on-line sworn affidavits attesting to livestock listing information, including type of livestock, origin and source information, physical identification methods, calving methods, and calving dates.

5. A system according to claim 1, wherein the network system is configured to perform the following operations:
  receiving input from one or more of the plurality of retailers defining one or more custom retail programs to prequalify livestock produced by one or more of the plurality of producers; and
  providing one or more webpages configured to provide for the one or more of the plurality producers to select and be prequalified for one or more of the one or more custom retail programs responsive to approval of the system administrator and the respective retailer defining the respective custom retail program.

6. A system according to claim 5, wherein the operation of providing the one or more webpages comprises communicating the one or more custom retail programs to the one or more of the plurality of producers, the one or more custom retail programs including livestock attribute qualifications comprising one or more of the following: feeding protocols including additives, rations, or both additives and rations, health and medication protocols, and animal care or handling protocols.

7. A system according to claim 1, wherein the network system is configured to allow the retailers to interact with finished cattle information to develop product promotion and pricing strategies, to complete supply forecasting objectives, and to request handling parameters controlled by the producers and intermediaries for the livestock in custom retail programs defined by the respective retailers and provided to allow one or more of the producers to be approved and qualified for selection thereof, the custom retail programs including livestock attribute qualifications to be complied with by the respective producers to be approved, qualified, and selected.

8. A system according to claim 1, wherein the network system is configured to allow retailers to prescribe attributes of the livestock to upstream supply chain participants comprising one or more of the producers and intermediaries via one or more defined custom retail programs defined by the respective retailers within the network system to thereby provide the one or more of the producers and intermediaries information to make changes to management of the livestock necessary to fulfill the attributes to create and define desirable parameters for consumers, and the producers review feedback regarding the value added by the attribute fulfillment to make their future livestock management decisions.

9. A system according to claim 6, wherein the livestock attribute qualifications comprise animal care or handling protocols.

10. A system according to claim 8, wherein the intermediaries comprise vendors external to the livestock supply chain, and wherein the network system is configured to provide an automated, Internet services-based buying program that enables the vendors, producers and other intermediaries to automatically coordinate real time management of their respective supplies inventory.

11. A system according to claim of 10, wherein the supplies inventory includes pharmaceutical products, feeding equipment, animal handling equipment, animal identification equipment, feed ration components, and fuel and energy inputs.

12. A system according to claim 1, wherein the intermediaries comprise vendors that provide decision support information, such as livestock industry information, network intelligence, and sponsored reports to the producers, other intermediaries, and retailers, subject to approval of the system administrator, through an interactive reporting within the network system whereby the producers, other intermediaries, and retailers interact with the decision support information to make livestock management decisions.

13. A system according to claim 5, wherein the custom retail programs are selected by the producers subject to approval of and qualification by the system administrator and, in the alternative, the system administrator selects the custom retail programs for the producers to increase livestock value to the producers.

14. A system according to claim 13, wherein the system administrator qualifies livestock for the custom retail programs by physically inspecting the livestock in-person at a physical location of the livestock and, in the alternative, by remote inspection via the Internet wherein the system administrator is in a different physical location than the livestock, such that decisions by the system administrator are implemented and the livestock is managed by the network system in response thereto.

15. A system according to claim 5,
  wherein the one or more custom retail programs include specifications for prescribing genetics of the livestock such that attributes of the livestock are prescribed prior to conception of the livestock; and
  wherein the genetics are prescribed by the respective retailer defining the respective custom retail program, for implementation pre-birth.

16. A system according to claim 5, wherein the producers qualify for the custom retail programs by fulfilling a set of production protocols that are communicated in the network system and verified by the system administrator and retailers.

17. A system according to claim 10, wherein the network system enables vendors to monitor, manage, and implement decisions for their respective supplies inventory to facilitate fulfillment of the livestock attributes prescribed by the retailers, including managing product orders, monitoring and reacting to customer inventory levels, and managing shipment and delivery communications and decisions to customers.

18. A system according to claim 4, further comprising fulfilling export document requirements with the network system to facilitate international transactions of livestock to foreign countries outside of the United States.

19. A computer-implemented method of managing an integrated supply chain of livestock, the method comprising:
  engaging producers that produce livestock, intermediaries that facilitate processing of the livestock to become finished product, and retailers that retail finished product derived from the livestock;
  facilitating by a system administrator for an integrated network system, interaction between the producers, intermediaries, and retailers via the Internet such that the producers, intermediaries, and retailers are interconnected to communicate, manage, market, and transact the livestock;

managing, by the system administrator, relationships between the producers, intermediaries, and retailers, and providing historical, benchmark, and seasonal information to the producers and retailers regarding the livestock;

receiving input from the retailers defining custom retail programs to prequalify livestock produced by producers;

providing one or more webpages configured to provide for one or more of the producers to select and be prequalified for one or more of the custom retail programs responsive to approval of the system administrator and the respective retailer defining the respective custom retail program, whereby the one or more of the producers are prequalified for the one or more custom retail programs by fulfilling a respective set of production protocols that verified by the system administrator and the respective retailer defining the respective custom retail program;

qualifying the livestock for the custom retail programs by physically inspecting the livestock in-person at a physical location of the livestock and, in the alternative, by remote, non-physical inspection via the Internet wherein the livestock is in a remote location, such that decisions are implemented and the livestock is managed; and the one or more custom retail pro prams defined by the respective one or more of the retailers each prescribe a change in a characteristic of a future supply of the livestock that is used by the respective one or more of the producers to change management of the livestock to fulfill the change in the characteristic desired by the respective one or more of the retailers, wherein the change in management of the livestock comprises adjusting one or more protocols of the set production protocols.

20. A method according to claim 19, wherein the one or more protocols of the set of production protocols comprises one or more of the following:
feeding protocols including additives, rations, or both additives and rations;
health and medication protocols; and
animal care or handling protocols.

21. A method according to claim 19, wherein the integrated network system and the system administrator provide for transacting the livestock from pre-birth through sales of finished product at a consumer retail level.

22. A method according to claim 19, further comprising:
enabling the producers to provide source verification of their livestock comprising on-line sworn affidavits attesting to livestock listing information, including type of livestock, origin and source information including ranch or firm name for each ranch or firm the livestock was located, physical identification methods, calving methods, and calving dates; and
fulfilling export document requirements to facilitate international transactions of livestock to foreign countries outside of the United States.

23. A method according to claim 19, wherein the intermediaries comprise vendors that are external to the livestock supply chain to provide decision support information, such as livestock industry information, network intelligence, and sponsored reports to the producers, other intermediaries, and retailers, through interactive reporting whereby the producers, other intermediaries, and retailers interact with the decision support information to make livestock management decisions.

24. A method according to claim 19, wherein the custom retail programs are selected by the producers and, in the alternative, selecting the custom retail programs for the producers to increase livestock value to the producers.

25. A method according to claim 19,
wherein the custom retail programs include specifications for prescribing genetics of the livestock such that attributes of the livestock are prescribed prior to conception of the livestock; and
wherein the genetics are prescribed by the respective retailer defining the respective custom retail program for implementation pre-birth.

26. A method according to claim 19, wherein the custom retail programs include qualifying the livestock based on attributes of the livestock including nutrition and feeding protocols, health and medication protocols, palatability, appearance, designation as all-natural products, product tenderness, product selection attributes, specialty labeled meat products, and packaging.

27. A method according to claim 19, wherein the integrated network system is configured to allow retailers to interact with finished cattle information to develop product promotion and pricing strategies, to complete supply forecasting objectives, and to request handling parameters controlled by the producers and intermediaries for the livestock in custom retail programs originated by the retailers.

28. A method according to claim 19, wherein the intermediaries comprise vendors external to the livestock supply chain, and wherein the integrated network system is configured to provide an automated, Internet services-based buying program that enables the vendors, producers and other intermediaries to automatically coordinate real time management of their respective supplies inventory; and wherein
the supplies inventory includes pharmaceutical products, feeding equipment, animal handling equipment, animal identification equipment, feed ration components, and fuel and energy inputs.

29. A method according to claim 28, wherein the integrated network system enables vendors to monitor, manage, and implement decisions for their respective supplies inventory to facilitate fulfillment of livestock attributes prescribed by the retailers, including managing product orders, monitoring and reacting to customer inventory levels, and managing shipment and delivery communications and decisions to customers.

* * * * *

UNITED STATES PATENT AND TRADEMARK OFFICE
CERTIFICATE OF CORRECTION

PATENT NO. : 8,775,276 B2
APPLICATION NO. : 11/185576
DATED : July 8, 2014
INVENTOR(S) : Traci L. Dowty et al.

It is certified that error appears in the above-identified patent and that said Letters Patent is hereby corrected as shown below:

In the Claims

At col. 11, claim 19, line 29, please delete the word "pro prams" and replace with --programs--

Signed and Sealed this
Fourteenth Day of October, 2014

Michelle K. Lee
*Deputy Director of the United States Patent and Trademark Office*